US009189786B2

(12) United States Patent
Roberts et al.

(10) Patent No.: US 9,189,786 B2
(45) Date of Patent: Nov. 17, 2015

(54) SYSTEMS AND METHODS FOR OPERATING TRANSACTION TERMINALS (75) Inventors: David A. Roberts, Warrington (GB); Ronald D. Carter, Cambs (GB); Jean-Paul Edmond Rans, Glasbais (BE); Enda Rice, Berchem-Sainte-Agahte (BE)

(73) Assignee: MasterCard International Incorporated, Purchase, NY (US)

( * ) Notice: Subject to any disclaimer, the term of this patent is extended or adjusted under 35 U.S.C. 154(b) by 770 days.

(21) Appl. No.: 13/077,626

(22) Filed: Mar. 31, 2011

(65) Prior Publication Data

US 2011/0244799 A1   Oct. 6, 2011

Related U.S. Application Data (60) Provisional application No. 61/319,451, filed on Mar. 31, 2010.

(51) Int. Cl.
  G06Q 20/32   (2012.01)
  G07F 7/08    (2006.01)
  G06Q 20/20   (2012.01)

(52) U.S. Cl.
  CPC ............ *G06Q 20/327* (2013.01); *G06Q 20/202* (2013.01); *G06Q 20/3278* (2013.01); *G07F 7/088* (2013.01)

(58) Field of Classification Search
  CPC .................................................. G06Q 20/327
  See application file for complete search history.

(56) References Cited

U.S. PATENT DOCUMENTS

| 5,329,589 | A  | * | 7/1994  | Fraser et al. ............... 379/91.02 |
| 5,453,601 | A  | * | 9/1995  | Rosen .............................. 705/65 |
| 5,982,293 | A  | * | 11/1999 | Everett et al. .................. 340/5.4 |
| 6,062,472 | A  | * | 5/2000  | Cheung .......................... 235/380 |
| 6,070,795 | A  | * | 6/2000  | Feiken ........................... 235/380 |
| 6,108,644 | A  | * | 8/2000  | Goldschlag et al. ............. 705/69 |
| 6,467,685 | B1 | * | 10/2002 | Teicher .......................... 235/379 |
| 6,510,998 | B1 | * | 1/2003  | Stanford et al. ............... 235/492 |
| 6,745,935 | B1 | * | 6/2004  | Grieu et al. .................... 235/376 |
| 2002/0123970 | A1 | * | 9/2002  | Ludtke et al. ................... 705/64 |
| 2003/0097344 | A1 | * | 5/2003  | Chaum et al. ................... 705/75 |
| 2005/0119978 | A1 | * | 6/2005  | Ates ............................... 705/67 |
| 2005/0125321 | A1 | * | 6/2005  | Gerstner et al. ................ 705/42 |
| 2007/0012763 | A1 | * | 1/2007  | Van de Velde et al. ........ 235/380 |
| 2007/0203792 | A1 | * | 8/2007  | Rao ................................. 705/14 |
| 2007/0215697 | A1 | * | 9/2007  | Ward et al. ..................... 235/380 |
| 2007/0262138 | A1 | * | 11/2007 | Somers et al. ................. 235/380 |

(Continued)

*Primary Examiner* — Calvin L Hewitt, II
*Assistant Examiner* — Eduardo Castilho
(74) *Attorney, Agent, or Firm* — Buckley, Maschoff & Talwalkar LLC (57) ABSTRACT

Methods, systems and apparatus are provided including a proximity payment device reader which includes a reader control program. A first process is executed upon receipt of an activation signal indicating the initiation of a transaction involving a proximity payment device with the reader, the first process causing at least a first signal to be transmitted to a second process, the second process causing the transmission of at least a second signal to the proximity payment device through a transceiver. In some embodiments, the processes may be executed to compare application data received from the payment device to data stored in a transaction log to determine if the proximity payment device was involved in an interrupted transaction. If the proximity payment device was involved in an interrupted transaction a signal is transmitted to the proximity payment device to attempt to retry the interrupted transaction.

5 Claims, 8 Drawing Sheets

(56) References Cited

U.S. PATENT DOCUMENTS

| | | | |
|---|---|---|---|
| 2009/0254440 A1* | 10/2009 | Pharris | 705/17 |
| 2009/0265260 A1* | 10/2009 | Aabye et al. | 705/30 |
| 2010/0057579 A1* | 3/2010 | Tan | 705/17 |
| 2010/0131413 A1* | 5/2010 | Kranzley et al. | 705/66 |
| 2010/0153267 A1* | 6/2010 | Ghaidan et al. | 705/41 |
| 2011/0042456 A1* | 2/2011 | Masaryk et al. | 235/380 |
| 2011/0078245 A1* | 3/2011 | Kiffer | 709/204 |

* cited by examiner

SYSTEMS AND METHODS FOR OPERATING TRANSACTION TERMINALS

CROSS-REFERENCE TO RELATED APPLICATION

This application claims the benefit of and priority to U.S. provisional patent application Ser. No. 61/319,451, filed Mar. 31, 2010, which provisional patent application is incorporated herein by reference in its entirety for all purposes.

BACKGROUND

Payment cards, such as credit cards, debit cards, stored value cards, or the like are a part of everyday life. For quite some time, most cards had a magnetic stripe to store payment account information which was read by a magnetic stripe reader at a point of sale ("POS") terminal. The magnetic stripe reader would read information including a payment account number from magnetic stripe, and then communicate the information to a payment network for processing. The reading of a magnetic stripe is typically an "all or nothing" type of read. Either the reader successfully reads the information or it doesn't. As a result, POS terminals with magnetic stripe readers are relatively simple devices.

More recently, payment devices that incorporate an integrated circuit ("IC") have been utilized as payment cards. Some of these payment devices are "contactless" payment devices which communicate with a card reader via wireless radio frequency ("RF") communication. One example of a contactless payment device are the so-called "PayPass" payment devices which operate pursuant to standards developed MasterCard International Incorporated, the assignee hereof. Other contactless payment devices and systems are also in use or in development.

It has been proposed that the capabilities of a contactless payment device be incorporated into a mobile telephone, thereby turning the mobile telephone into a contactless payment device. Typically a mobile telephone/contactless payment device includes integrated circuitry with the same functionality as the RFID (radio frequency identification) IC of a contactless payment card. In addition, the mobile telephone/contactless payment device includes a loop antenna similar to that of a contactless payment device that is coupled to the payment-related IC for use in sending and/or receiving messages, via short-distance wireless communications, in connection with a transaction that involves contactless payment.

Contactless payment devices in other form factors, such as key fobs, wristwatches, wristbands and stickers, have also been proposed. It has also been proposed that mobile devices other than mobile telephones—such as PDAs with mobile communication capabilities—may also incorporate contactless payment functionality.

In a typical transaction involving a contactless payment device, the contactless payment device is presented to a contactless reader associated with a terminal (such as a POS terminal). An interrogation process ensues in which the payment device exchanges data with the reader. Device holders who are in a hurry in certain environments (such as where the contactless payment device is used in a transit environment, for example) tend to remove the contactless payment device from communication with the reader quickly. This can result in failed transactions. It would be desirable to provide systems and methods to allow such failed transactions to be recovered or at least identified.

Further, it would be desirable to provide a reader architecture and methods which allow the reader and terminal to act in a synchronized manner, allowing the logic data associated with (or available to) the terminal to be provided to the terminal in a synchronized or stepped process. Still further, it would be desirable to provide a reader which is capable of communication with a variety of different payment device configurations.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present invention, a payment reader and terminal are provided which allow processing of payment card transactions, including transactions involving contactless and other payment devices. Pursuant to some embodiments, the reader and terminal are adapted to process transactions in a synchronized manner such that the reader requests data from the terminal and the terminal can allow for piecemeal or stepped reading of information from the reader and the payment device. In this manner, embodiments ensure that the reader does not move to the next phase of a transaction until the terminal has confirmed that the reading phase has been completed. Such a stepped reading of information allows a collaboration between terminal and reader where the terminal may request data from the payment device during the transaction, may then condition the transaction on the data provided and may provide data for storage on the payment device, all during the payment transaction without compromising the correctness of the payment transaction flow, and therefore allows the terminal to control the reading process with certainty. The architecture also facilitates other features to be efficiently and reliably implemented such as recovery from torn transactions and payment device balance reading. As a result, embodiments are particularly suited for use with contactless payment devices, including mobile phones and contactless payment cards, even in environments where short transaction times are required (such as in transit applications or the like).

A number of transactions involving contactless payment devices are described herein. Those skilled in the art, upon reading this disclosure, will appreciate that different payment schemes and protocols may utilize features of the present invention with desirable results. For illustration of some features of the present invention, a specific implementation involving PayPass or EMV compliant payment devices will be described. Further details of certain transactions involving such devices are described in our co-pending and commonly assigned U.S. patent application Ser. No. 12/915,550, filed on Oct. 29, 2010 and entitled "METHODS FOR RISK MANAGEMENT IN PAYMENT-ENABLED MOBILE DEVICE", the contents of which are hereby incorporated by reference in their entirety for all purposes.

Figure 1:
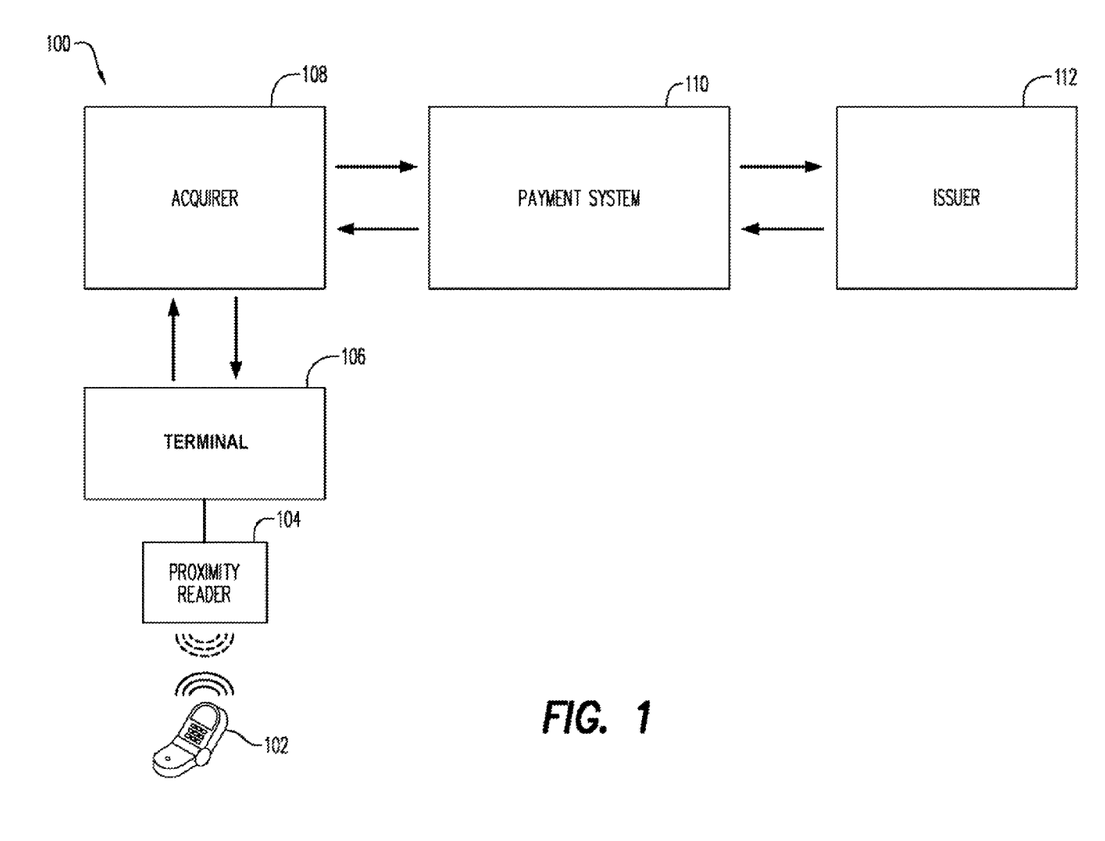
FIG. 1 is a block diagram that illustrates a system provided in accordance with some embodiments of the present invention.

FIG. 1 is a block diagram that illustrates a payment system 100 provided in accordance with some embodiments of the present invention.

The system 100 includes a contactless payment device 102 which, as depicted, is embodied in a mobile telephone (e.g., the mobile telephone is payment-enabled). The payment-enabled mobile telephone 102 may be operable as a mobile telephone, while also being able to perform functions of a contactless payment device and to interact with a payment terminal 106 via a proximity reader 104 configured pursuant to embodiments of the present invention. While the contactless payment device 102 is illustrated in FIG. 1 as being configured as a payment-enabled mobile telephone, embodiments of the present invention are operable with more traditional form factor payment devices, as well as payment devices configured as fobs or the like.

The system 100 further includes a proximity reader 104 associated with a transaction terminal 106. The proximity reader 104 and the transaction terminal 106 may be substantially or entirely conventional in their hardware aspects and may also incorporate conventional software capabilities as well as additional software capabilities provided in accordance with the present invention and described below. Further, the reader 104 and the terminal 106, although shown as being separate, may be configured as a unitary component. As such, the terms "terminal" and "reader" as used herein are used to refer to a logical separation of software or other components, and not necessarily physical separation. The proximity reader 104 is configured to interact with contactless payment devices such as device 102 via a contactless interface. In some embodiments, the reader 104 may also be configured with a contact interface and/or a magnetic stripe reader, allowing the reader 104 to interact with a variety of different types of payment devices.

As will be recognized by those who are skilled in the art, the proximity reader 104 and the transaction terminal 106 may be, for example, located at the premises of a retail store and operated by a sales associate of the retailer for the purpose of processing retail transactions. The proximity payment device 102 is shown in FIG. 1 to be interacting with the proximity reader 104 and the transaction terminal 106 for the purpose of executing such a purchase transaction. Some details of the transaction terminal 106 are presented below in conjunction with FIG. 4.

An acquirer system 108 operated by an acquiring financial institution is also shown as part of the system 100 in FIG. 1. The acquirer system 108 may operate in a conventional manner to receive an authorization request for the transaction from the transaction terminal 106. The acquirer system 108 may route the authorization request via a payment system 110 to an issuer system 112 operated by the issuer of a payment account that is available for access by the proximity payment device 102. The authorization response generated by the issuer system 112 may be routed back to the transaction terminal 106 via the payment system 110 and the acquirer system 108.

The payment system 110 may be entirely or substantially conventional; one example of a suitable payment system is the well-known BankNet system operated by MasterCard International Incorporated which is the assignee hereof.

In general, the issuer system 112 may be operated by or on behalf of a financial institution that issues payment card accounts to individual users. The issuer system 112 may perform functions, such as (a) receiving and responding to requests for authorization of payment account transactions to be charged to payment card accounts issued by the issuer; and (b) tracking and storing transactions and maintaining account records.

The components of the system 100 as depicted in FIG. 1 are only those that are needed for processing a single transaction. Those skilled in the art will recognize that a practical embodiment of the system 100 may process many purchase transactions (including simultaneous transactions) and may include a considerable number of payment card issuers and their systems, a considerable number of acquirers and their systems, and numerous merchants and their transaction terminals and associated readers. The system may also include a very large number of payment card account holders, who carry payment devices.

Pursuant to some embodiments, the terminal 106 is configured, pursuant to the present invention, to delegate payment processing to the reader 104. In this manner, the terminal 106 may focus its processing on its own business logic, which may include storage of data on the proximity payment device 102. The terminal 106 may include business logic and software which allows the terminal 106 to perform processing to support transactions, such as, for example, determining the transaction amount (although in some cases, the transaction amount may be determined based on information retrieved from the proximity payment device 102 or using other techniques), as well as performing transaction logging to store transaction clearing records and to prepare batch files or real-time messages for submission to the acquirer systems 108. In some embodiments, the terminal 106 may also include data storage logic to analyze (and possibly update) data received from the proximity payment device 102 via the reader 104. For some transactions or environments, the terminal 106 may also include security logic to check and protect the integrity of data received from the proximity payment device 102 via the reader 104.

Pursuant to some embodiments, the reader 104 is configured to interact with the proximity payment device 102 during the course of a transaction. Where needed, the reader 104 is operable to pass data from the proximity payment device 102 to the terminal 106 and from the terminal 106 to the payment device 102 during the payment transaction. The reader 104 may include processing logic and memory allowing the reader to collect necessary data from the payment device and to obtain a transaction authorization as well as to populate a clearing record for transmission from the terminal 106 to the payment system 110. In situations where the payment device holder needs to be verified the reader 104 is configured to perform such an verification process. Further, the reader 104 is configured with storage logic to read data from the payment device 102, track torn transactions (as described further below) and write data back to the payment device 102.

Pursuant to some embodiments, communication between the reader 104 and the terminal 106 is via signals which are asynchronous events that are placed in a process queue and that are handled in a first-in, first-out basis. Pursuant to some embodiments, the terminal 106 and the reader 104 may be viewed as each having one queue, even if internally the terminal 106 and the reader 104 have multiple queues. Further details of communication between the terminal 106 and reader 104 will be described further below. However, in general, the terminal 106 is in control of activating and deactivating the reader 104 and is in control of the reader as needed to update the database of the reader 104, update the current transaction dataset of the reader 104, and request data from the reader 104. The reader 104 is provided with software (including "kernel" software as described herein) which is in overall control of the transaction flow involving the payment device 102. It is also possible to implement the same functionality with a model that manages signals in multiple queues per process or uses other forms of inter process communications other than signals. The term signal is used generically here as a standard way to describe various inter-process communication mechanisms.

Pursuant to the present invention, the terminal 106 and the reader 104 are synchronized such that if the reader requires information during a transaction with a payment device 102 it will request the information from the terminal 106 and wait until it receives the information. Further, the terminal 106 may provide information earlier than needed by the reader in order to allow the reader and any active processes to proceed efficiently without any unnecessary time delays. The terminal 106 may also withhold data in order to cause the active process in the reader 104 to request the data so that the terminal may make a determination about subsequent actions. In general, the reader 104 may request data from the terminal using a request message. The use of such a request message allows the terminal 106 to stay in synch with the reader 104. Such a synchronized process provides a number of advantages during the processing of transactions as will be hereinafter described and which will become apparent to those skilled in the art.

Figure 2:
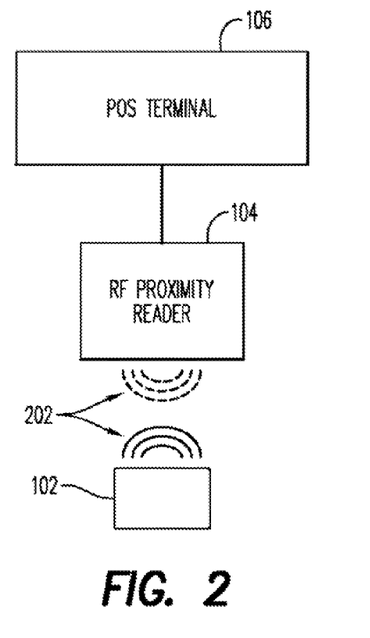
FIG. 2 is a block diagram that illustrates portions of a system for conducting a transaction involving a wireless device.

FIG. 2 schematically illustrates some communication aspects of a typical transaction in which a proximity payment device 102 is used. The terminal is represented by item 106, and the reader is represented by item 104. Wireless communication between the proximity payment device 102 and the reader 104 is indicated at 202. The wireless communication 202 may be conducted in accordance with one or more standard protocols, such as "EMV Contactless" and/or NFC all of which are well known to those who are skilled in the art. The device 102 may be a payment-enabled mobile telephone or other form factor proximity payment device.

Figure 3:
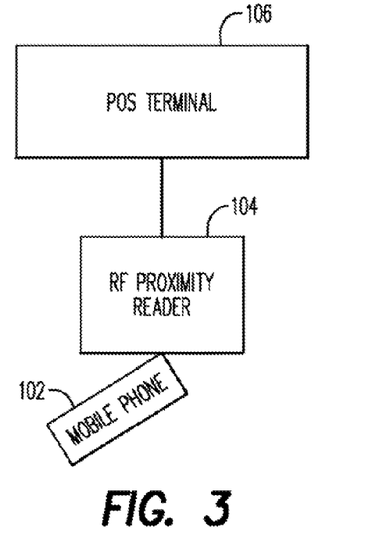
FIG. 3 is a block diagram that illustrates portions of a system for conducting a transaction involving a mobile device.

FIG. 3 schematically illustrates some physical aspects of a purchase transaction. As in FIG. 2, the terminal 106 and its associated reader 104 are shown. The proximity payment device 102 (depicted as a payment-enabled mobile telephone) is also shown in proximity to the reader 104. In a common manner of initiating the wireless communication depicted in FIG. 2, the user of the proximity payment device 102 briefly taps the proximity payment device 102 at a particular location on the reader 104. The location on the reader 104 at which the proximity payment device 102 is to be tapped may be indicated to the user by a standard logo affixed to the reader 104, such as the "PayPass" logo or another industry specific contactless identifier.

Figure 4:
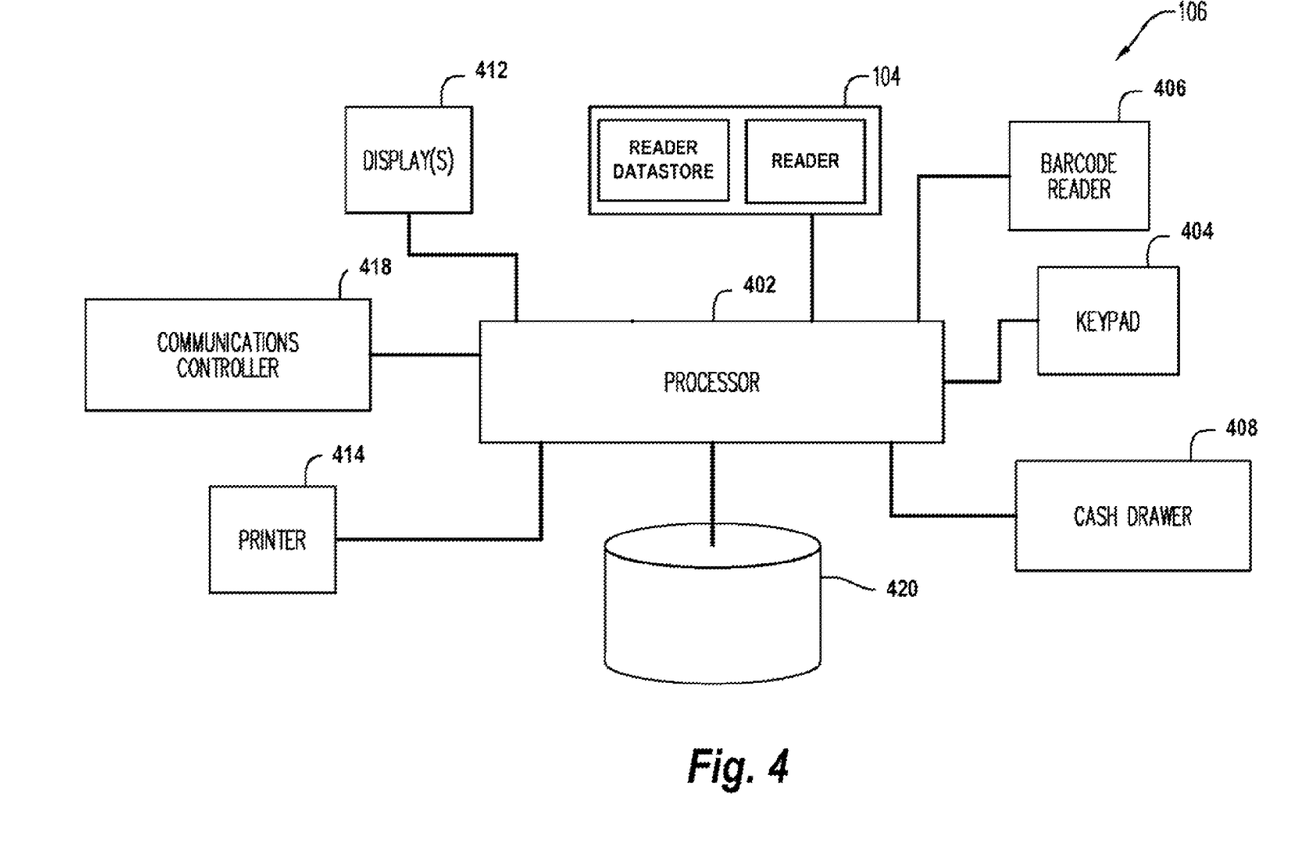
FIG. 4 is a block diagram representation of a terminal and reader pursuant to some embodiments of the present invention.

FIG. 4 is a block diagram of a typical embodiment of the terminal 106 depicted in FIG. 1. As shown, a reader 104 is in communication with the terminal 106. In some embodiments, the terminal 106 and the reader 104 may be largely or entirely conventional in their hardware aspects. Nevertheless, the terminal 106 and reader 104 may be programmed in accordance with features of the present invention to provide functionality as described herein.

The terminal 106 may include a processing element (or elements) such as the processor 402 shown in FIG. 4. The processor 402 may for example be a conventional microprocessor, and may operate to control the overall functioning of the terminal 106. It may also be implemented as multiple microprocessors for speed. The terminal 106 may also include conventional peripheral components, in communication with and/or controlled by the processor 402, such as one or more of: (a) a keypad 404 for receiving input from a human operator of the terminal; (b) a barcode reader 406 for reading product barcodes from products brought to the terminal for purchase; (c) a cash drawer 408 for storing cash received from customers in certain transactions; (d) one or more displays 412 for providing output (e.g., identifying products presented for purchase and their prices, indicating sales tax due, indicating transaction subtotals and totals, etc.); (e) a printer 414 for printing out sales receipts; (f) the above-mentioned reader 104, for exchanging wireless short range communications/near field communications (NFC) with proximity payment devices (as well as, in some embodiments, magnetic stripe devices and contact payment devices); and (g) a communication controller 418 for allowing the processor 402, and hence the terminal 106 to engage in communication over data networks with other devices such as a merchant processing system (not shown), and an acquirer (FIG. 1) or its transaction processor (not shown). In some embodiments, at least one of the displays 412 may be a touch screen, so as to provide an input function as well as an output function. In some embodiments, the terminal 106 may also include a magnetic stripe reader for reading payment card account numbers and related information from magnetic stripe payment cards. In some embodiments, the magnetic stripe reader may be embodied in or associated with the reader 104.

In addition, the terminal 106 may include one or more memory and/or data storage devices (indicated collectively at 420), which may comprise any combination of one or more of a hard disk drive, RAM (random access memory), ROM (read only memory), flash memory, etc. The memory/data storage device(s) 420 may store software and/or firmware that programs the processor 402 and the terminal 106 to perform functionality as described herein. Further, the terminal 106 may include one or more housings (not shown) which contain and/or support one or more of the other components shown in FIG. 4.

As shown, the reader 104 also includes a reader datastore for use in storing data such as kernel data as well as a torn transaction log as will be described further below. In some embodiments, the reader 104 also includes a processor, communications controller and storage devices to store software and/or firmware that programs the reader 104 to perform functions as described herein.

Figure 5:
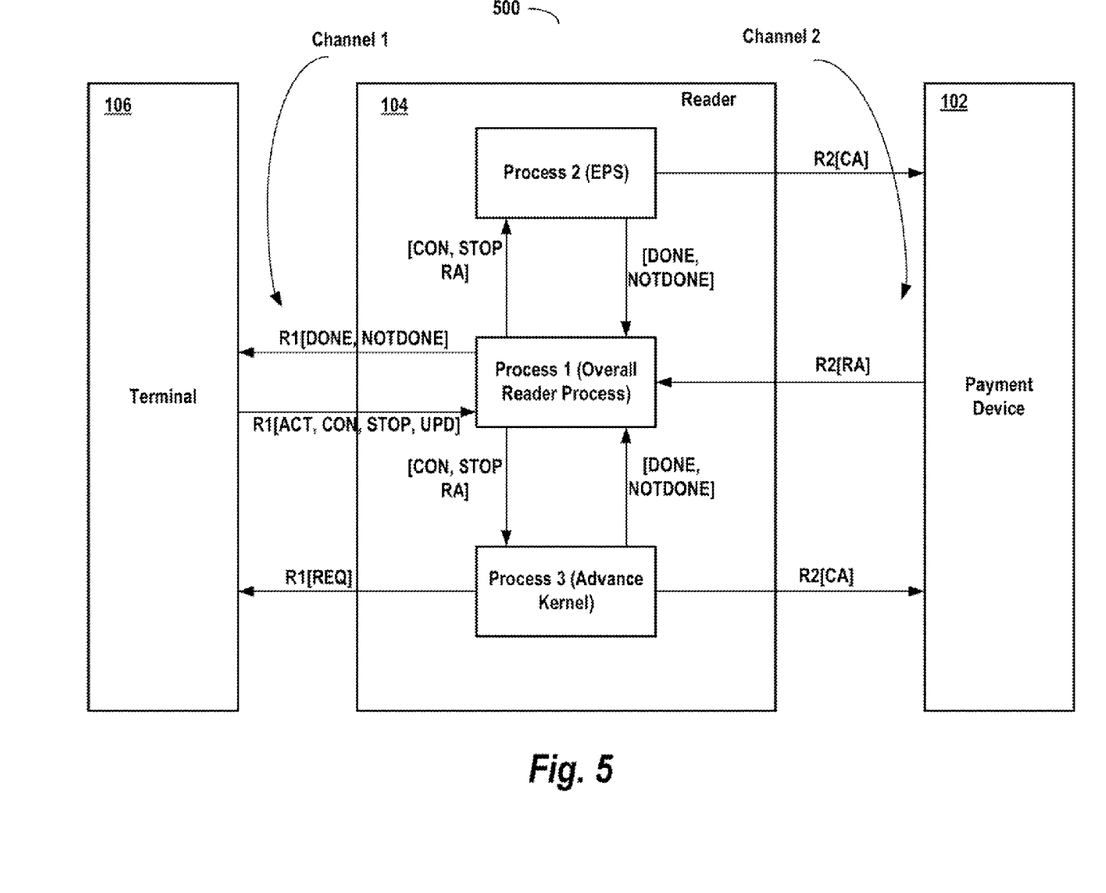
FIG. 5 is a block diagram representation of a logical architecture of a reader pursuant to some embodiments.

Reference is now made to FIG. 5, where a block diagram is shown which depicts a logical model 500 of the reader 104 and communication between the reader 104, the terminal 106, and the payment device 102. Each of the processes depicted in the logical model refer to logical processes that may be deployed using a software kernel executed by a processor of the reader 104. As depicted, three processes are shown. However, those skilled in the art upon reading this disclosure will realize that further processes may be employed based on the complexity or requirements of different transaction processes or implementations. As an example, a $4^{th}$ process may be implemented to manage the routing of communications to the payment device 102. Signals may also be routed differently, for example the CON signal conveying transaction specific data to the kernel may be sent directly and not via Process 1. As shown, the reader 104 has several communications channels—a first channel between the reader 104 and the terminal 106, and a second channel between the reader 104 and the payment device 102. Each of the processes (which are labeled as "Process 1", "Process 2" and "Process 3") communicates with other processes by sending signals over these channels. The signals get queued, and are handled as events. At the same time that these processes and signals are managed, the reader 104 also maintains a reader data store (shown in FIG. 4) which maintains a number of separate datasets. The datasets may include static as well as transient datasets.

Pursuant to some embodiments, each of the processes in the reader 104 run concurrently with the other processes and implement a state machine. Each process has one queue for incoming signals, and all incoming signals are placed in that queue. As depicted, "Process 1" is a reader management process which is the initial state of the reader 104. This process controls the overall functions of the reader 104 and manages signals received from the payment device 102 and the terminal 106. For example, the terminal 106 may request that the reader 104 update its database (e.g., for use in processing a transaction) or request that the reader 104 begin processing a transaction. As shown, the terminal 106 may issue a signal such as "ACT" to activate the reader in order to perform a transaction (which command may be provided with transaction specific data such as a transaction amount). The terminal may also issue a "CON" signal to instruct the reader to continue. The CON signal may be provided with data needed for the specific transaction in progress and indicates to the reader 104 that the reader should proceed with the transaction. The CON signal may be sent in reply to a REQ (or request) signal sent from the reader to the terminal, or it may be sent spontaneously by the terminal 106. An "UPD" signal sent by the terminal may include data to manage the reader's datastore, and may include a list of data items to be added to the datastore and/or a list of items to be deleted. A "STOP" signal may be transmitted to indicate that the reader should stop or abort a transaction (e.g., where the terminal has detected an error or anomaly in the transaction).

The reader 104 may similarly send signals to the terminal 106 over channel 1. For example, the reader 104 may transmit a "REQ" signal to the terminal indicating a request for extra data that may be required to complete a current transaction. The REQ signal may also be used to provide information to the terminal 106, either because the reader 104 knows it is needed for further processing or because the terminal 106 specifically requested the data. The reader 104 may also transmit a signal indicating that a transaction is "DONE" or "NOTDONE" (for success or failure of a transaction). Such signals may further include data specifying the results of the transaction. For example, in the event of a successful completion of a transaction, the reader may transmit a "DONE" signal along with transaction clearing information and other data needed by the terminal 106 to initiate clearing and settlement of the payment transaction. The issuance of a "DONE" signal does not necessarily mean that a transaction has been approved, it merely signals the completion of the transaction.

The reader 104 is also shown as having two other processes. "Process 2" is a process that is started by Process 1 (e.g., after Process 1 receives an ACT signal from the terminal 106), and is used to perform application activation on the payment device 102 (e.g., operation of Process 2 causes an card activation message ("CA") to be transmitted to the payment device 102 over channel 2. If the activation is completed without error, Process 2 is terminated (with a "DONE" or "NOTDONE" signal passed back to Process 1) and a kernel will be executed by starting Process 3.

Process 3 is executed based on the outcome of Process 2, and may further depend on data retrieved from the card (via R2). In a plain or standard payment transaction, the kernel of Process 3 will execute, complete and inform Process 1 of the results (e.g., "DONE", "NOTDONE") and then exit. For transactions involving data storage, however, some interaction with the terminal may be required. For example, the kernel of Process 3 may request data ("REQ") from the terminal 104 and/or pass data to the terminal. The terminal may respond accordingly with a signal which may include data. Different payment applications may involve the use of different kernels. However, in some embodiments, even where additional kernels are provided, only one process 3 will execute at a time, and the additional kernels will execute as Process 3 (i.e., the overall reader process and the activation process will still likely exist, however the additional kernels will each execute as Process 3).

The reader 104 exchanges signals with the payment device 102 via channel 2. In general, pursuant to some embodiments, communications with the payment device 102 are in command/response pairs (e.g., pursuant to the EMV specification or the like). The data and signals passed back and forth between the reader 104 and the payment device 102 may depend on the specific payment scheme (e.g., EMV or the like), as well as the specific payment application involved in the transaction.

In some situations, the reader 104 may receive data (either from the terminal or the payment device) which is to be stored in a reader database. Both static and transient datasets may be stored. A generic dataset may be stored which is a set of Tag-Length-Value (TLV) data objects that includes persistent data not specific to a particular transaction or to a specific kernel (e.g., such as a terminal country code). TLV coding is commonly used in smart card and payment systems such as EMV but other representations are equally valid. Kernel specific data may also be stored, which includes TLV data objects and persistent data that may differ from kernel to kernel and that are not transaction specific (such as tag and data items that are payment system specific, such as a terminal's cardholder verification method ("CVM") limit, or the like). In some embodiments, datasets stored in the reader database may be populated during the course of a transaction (triggered by receipt of the "ACT" or activate signal from the terminal 106). This transaction data may be updated during kernel processing and may include TLV data associated with the transaction (such as amount and authorized data). Further, the reader database may include data resulting from Process 2 processing (e.g., such as FCI data returned from payment application selection on the payment device 102). When the kernel process associated with Process 3 is started, the reader management process (Process 1) provides a copy of the complete reader database to the kernel, providing the kernel with all the context and information needed to process the transaction.

The concept of this structured, synchronized architecture and the data exchange mechanisms described above may be extended to provide further processes and functionality at the reader 104. For example, a reader logical architecture may be provided which includes a number of defined processes in addition to those described above in conjunction with FIG. 4. For example, in one embodiment, the reader 104 is provided with a main process (similar to "Process 1" described above) which performs reader management functions including overall control and sequencing of the different reader processes. In some embodiments, this main process is responsible for coordinating the other processes, configuring and activating any kernel processes and for the processing of any outcomes. Additional processes may be provided to provide certain services, such as a process for managing the contactless interface, a process for managing the user interface, a process for selecting the relevant payment device application and kernel, and a kernel process for interacting with the payment device once the application has been selected. Other processes may also be provided. Pursuant to the present invention, each of the processes runs independently of the other processes and implement a state machine. Each process has a single queue for incoming signals and all signals are placed in that queue. By providing such a configuration, the reader and terminal are able to interact in a controlled and synchronized fashion.

By using such a structured, synchronized architecture for reader processing, embodiments allow the terminal 106 and the reader 104 to remain in step during the course of a transaction. This has a number of benefits, one of which will now be illustrated by describing a process where the terminal business logic may wish to condition the amount of the transaction dependent on specific non payment data stored on the payment device such as a club, entitlement or loyalty identifier. This simple example is designed to illustrate the process architecture, separating payment transaction flow from business logic in the reader and terminal respectively. A more complex example will be presented later after the processing of torn transactions has been described.

With reference to FIG. 5, the terminal commences the transaction by sending an ACT signal to the Reader 104 with an Amount for the transaction. It also, either in the ACT signal or pre-configured in the database with an UPD signal, indicates that it wishes a specific TLV data item to be read from the payment device, if it exists, and sent to the terminal. The reader 104 activates the payment device 102 and, following the decision of Process 2 on the type of payment device presented, initiates the appropriate kernel as Process 3. Process 3 will be given the request from the terminal 106 and will commence the transaction flow as defined, for example, in EMV. When it encounters the specific TLV data item requested by the terminal 106 it will immediately send a signal to the terminal 106 with the referenced data. It will then continue the processing of the transaction as far as it can without a response from the terminal 106. Typically, this means that it will continue to process EMV "Read Record" commands as defined by the EMV "Application File Locator" until it has read all data. It may also then perform internal risk management of offline data authentication but cannot proceed to complete the transaction without information from the terminal 106. This information, provided by the terminal 106 in a CON signal may contain, for example, an updated transaction amount. The terminal 106 may have been computing this in parallel with the reader 104 processing of the transaction therefore significantly improving performance over commonly found terminal/reader implementations which either cannot perform this type of logic or would incur a time penalty in the middle of the transaction.

Many other variations on the business logic are possible, for example as described later the terminal may wish to store data back to the payment device during the transaction, it may wish to ask for additional data depending on the first data received, it may wish not to proceed at all (and STOP the transaction) or it may wish to know the offline balance of the payment device 104 either before or after the transaction is completed. The architecture of FIG. 5 is an efficient way to support these future business requirements without requiring the terminal 106 to understand the payment logic or the reader 104 to change every time business requirements of the terminal change.

The reader architecture also efficiently permits for recovering from "torn" transactions (where a payment device is removed prematurely from a reader 104, thereby interrupting the normal completion of the transaction). Such "torn" transactions may be particularly common in environments such as transit or quick serve restaurants where consumers are in a hurry. If a payment device 102 is removed from a reader 104 before the transaction has completed, the natural behavior of the consumer may be to try again. If the payment device 102 maintains an offline balance (e.g., the payment device is a prepaid or preauthorized product, which is common in transit and quick serve restaurant environments), then the counters in the payment device 102 application may have been decremented. Repeating the transaction would mean that the consumer will effectively pay twice or may believe that they have paid twice, until clearing resolves the issue. In some situations, denial of further use of the payment device may occur if the balance has decremented and the merchant has not been paid. While other mechanisms are typically implemented to avoid or reduce the likelihood of a torn transaction occurring, there is still often a window of time in which a torn transaction can result. Embodiments provide mechanisms that allow a reader 104 to recover from a torn transaction. Again, the reader 104 effectively hides the transaction logic from the terminal 106 and the terminal, whilst informed of the fact that the transaction has (or has not) been recovered need not concern itself with the mechanisms.

Pursuant to some embodiments, a signal referred to as the "Recover AC" command is provided to enable recovery of a torn transaction (where the term "AC" refers to an "Application Cryptogram" as the term is used in the EMV specifications available at www.emvco.com). In general embodiments operate as follows. First, if the reader 104 failed to receive a response to a command from the payment device it may ask for it again on the next transaction by issuing a "Recover AC" command. For example, the reader may be expecting a response to the EMV "Generate AC" command which sends transaction-related data to the payment device, which then computes and returns an Application Cryptogram). Pursuant to EMV standards and depending on the risk management in the payment device, the cryptogram returned by the payment device may differ from that requested in the command message from the reader. The payment device may return an "AAC" (transaction declined), an "ARQC" (online authorization request), or a "TC" (transaction approved). Further details of the AC and interactions between the reader and the card during EMV-compliant payment transactions are available at www.emvco.com. If the customer had removed the payment device 102 from the reader 104 too soon, the reader will never receive the AC and it will "time-out" the transaction. The merchant will typically ask for the payment device 102 to be presented again. The terminal 106 does not need to know about transaction recovery, it merely wishes to transact and instructs the reader accordingly. The reader needs to handle the recovery whilst honouring the request of the terminal 106.

If the reader 104 does not receive a response to the Generate AC command and timed out the first attempted transaction, it will log this fact and the corresponding transaction data in its database. When the same payment device 102 is presented a second time it may ask for the original result again by issuing a "Recover AC" command. If the payment device 102 had not advanced so far in its transaction as to update its counters and create the response to the Generate AC command and create the response, then the payment device 102 will respond to the reader 104 by sending a response indicating that it cannot recover (e.g., there is nothing to recover as no AC exists), and the reader 104 will immediately ask for a new Application Cryptogram as per the request from terminal 106. If, however, the payment device 102 had updated its counters and responded, but for some reason (e.g., a torn transaction) the response was not received by the reader 104, then the payment device 102 will provide the original response again. In some embodiments, where the payment device 102 does not support transaction recovery, then the reader 104 will continue with a new transaction. In order to provide this processing, the reader 104 stores and maintains a torn transaction log in the reader data store (as shown in FIG. 4). The reader 104 may purge the torn transaction log after each transaction is successfully completed.

Figure 6:
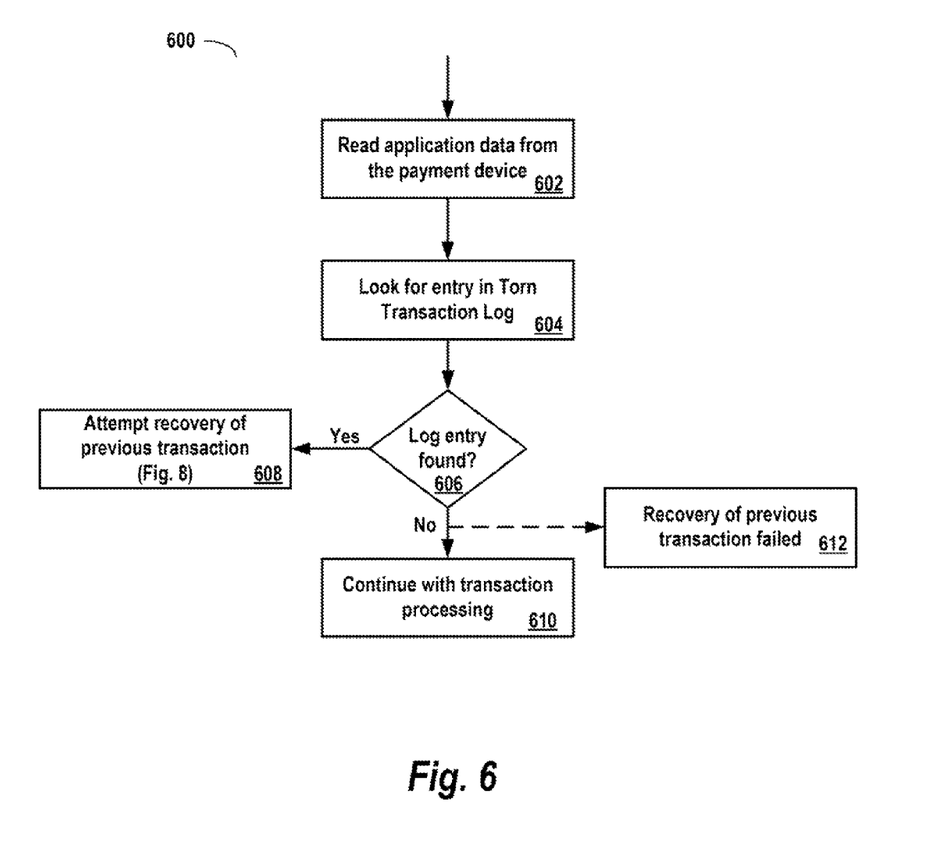
FIGS. 6-9 are flow charts that illustrate transaction processes according to some embodiments of the present invention.

Reference is now made to FIG. 6 where a process 600 for identifying a torn transaction is shown. Process 600 may be performed by the reader 104 under control of software and code to provide an executable process for identifying a torn transaction. The process 600 begins at 602 where the reader 104 reads application data from the payment device 102 (e.g., during a contactless interaction between a payment device and the reader, such as in a payment transaction). The application data may include reading the primary account number ("PAN") and PAN sequence number ("PSN") from the payment device. Processing continues at 604 where the reader 104 checks for a matching entry in the torn transaction log (e.g., an entry with the same PAN and PSN). If the reader determines that there is a log entry at 606, processing continues at 608 where the reader 104 attempts recovery of the previous transaction. For example, the reader 104 may transmit a signal to the payment device 102 such as a "Recover AC" command s described in conjunction with FIG. 8.

If processing at 606 reveals no matching log entry, processing will continue at 610 with normal transaction processing. If there was a previous torn transaction, but there was no matching transaction record in the torn transaction log, then it is likely that a previous attempt at recovering the torn transaction failed and the entry in the torn transaction log was erased (e.g., such as at step 804 of FIG. 8).

Figure 7:
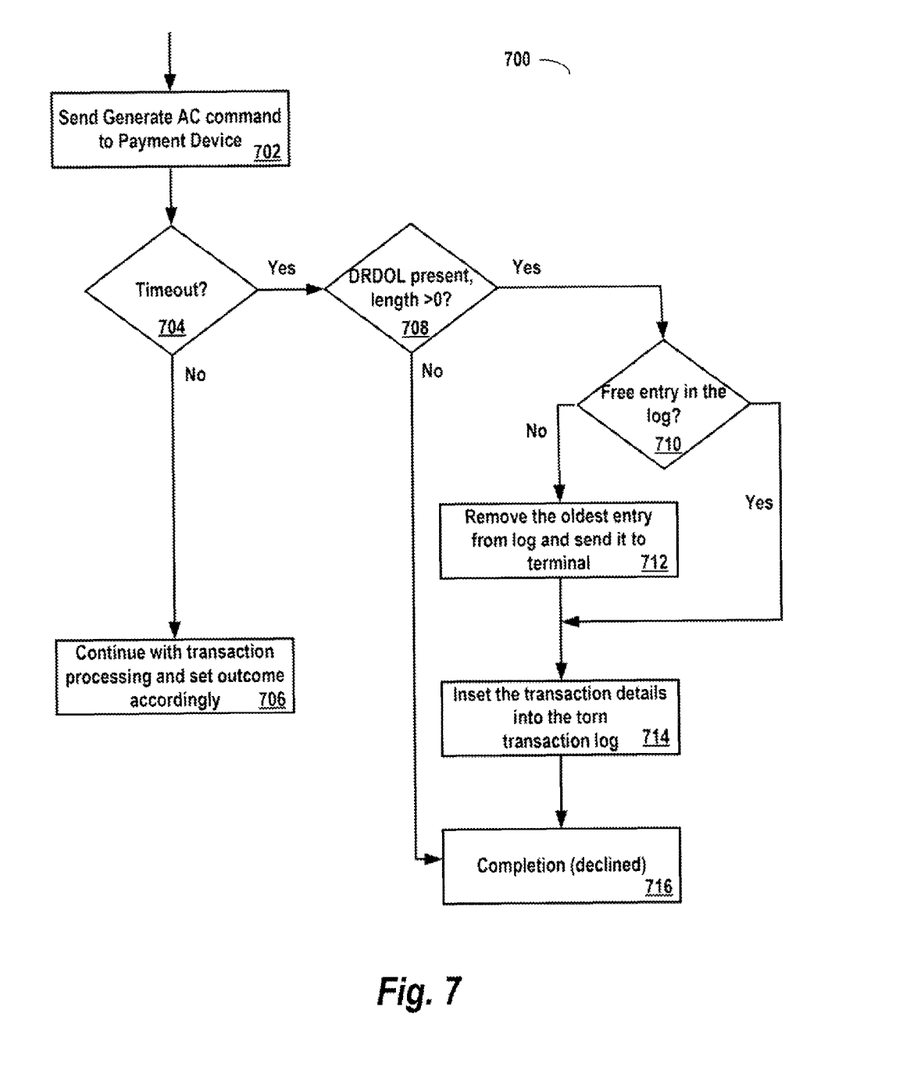

Reference is now made to FIG. 7, where a process 700 is shown for logging a torn transaction. The process 700 is invoked when a timeout occurs during a transaction involving a reader 104 and payment device 102 (e.g., such as when a timeout occurs during processing of a "Generate AC" command in the case of EMV payment transactions). As shown in FIG. 7, at 702 during a transaction, the reader 104 issues a "Generate AC" command to the payment device 102. In the case of a normal (non-torn) transaction, the reader 104 will receive a response to the command, and processing will continue as normal at 706. However, if the reader 104 does not receive a response within an expected time period, a timeout is identified at 704 and processing continues at 708 where the reader 104 determines whether the payment device 102 involved in the torn transaction supports recovery pursuant to the present invention (e.g., whether the payment device is capable of processing a "Recover AC" command). In some embodiments, the reader may determine whether the payment device 102 supports transaction recovery by reading a data element previously provided by the payment device. For example, the data element may be referred to as a "Data Recovery DOL" (DRDOL) data element. If the reader 104 did not read a DRDOL element from the payment device 102, then torn transaction recovery cannot be performed and processing continues at 716 where the transaction is completed and the transaction is declined.

If, however, the reader 104 did read a DRDOL element from the payment device 102, then processing continues at 710 where the reader 104 determines whether a free entry in the torn transaction log is available. In general, in some embodiments, if an entry already exists in the torn transaction log then a new entry will be added for the present transaction, however, in some embodiments, only a single entry in the log may be permitted. If adding a new entry to the log means that an old record will be displaced, then the old record may be transmitted to the terminal 106. Processing continues at 714 where the transaction details associated with the present torn transaction are inserted into the torn transaction log. In some embodiments, the log is updated with the data associated with the DRDOL as well as information identifying the PAN and PSN of the payment device associated with the torn transaction. Processing continues at 716 where the transaction is completed (as declined).

Figure 8:
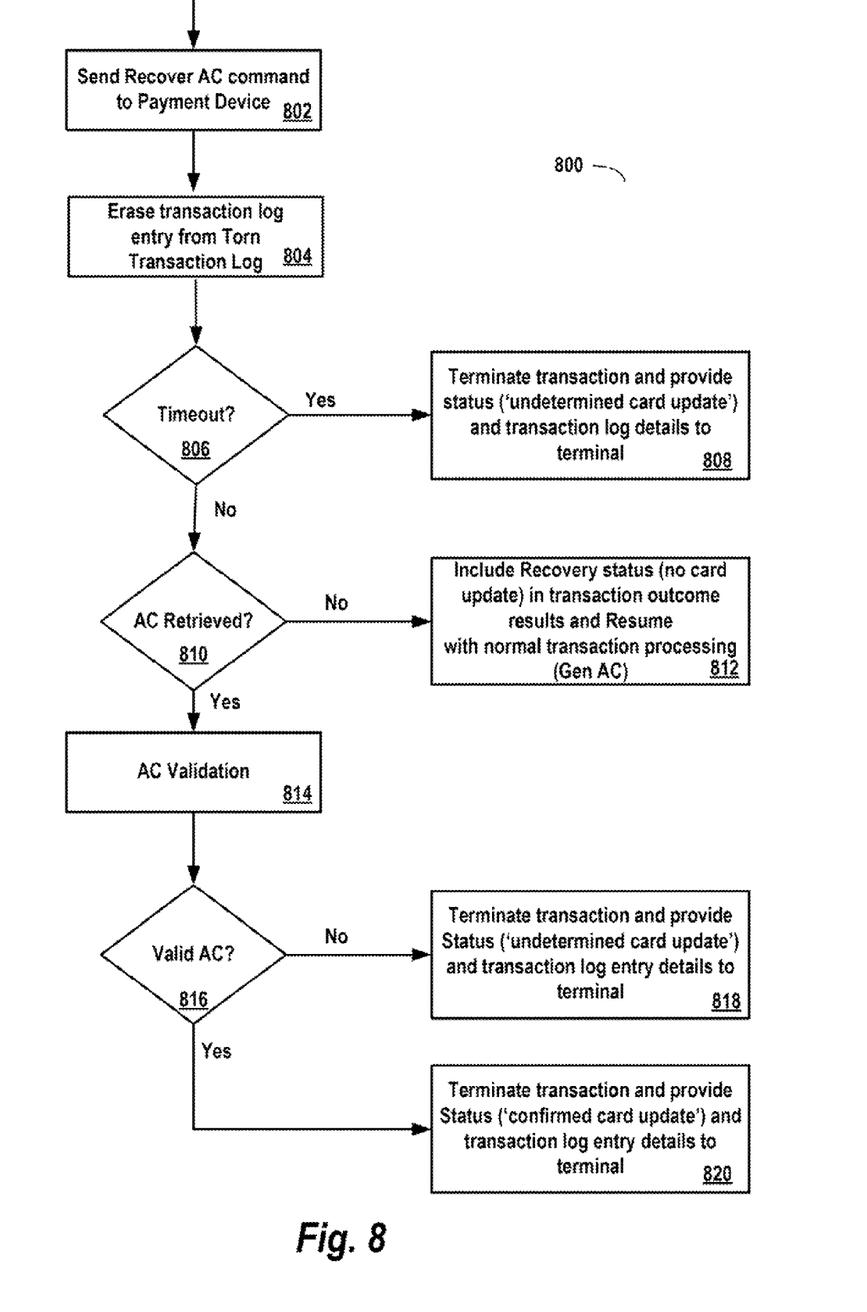

Reference is now made to FIG. 8 where a process 800 for recovering a torn transaction is shown. Process 800 may be performed by the reader 104 after processing of FIG. 6 (e.g., after processing at step 608 and after the reader has determined that a torn transaction entry is in the torn transaction log associated with the payment device 102 involved in the instant transaction). Recovery processing begins at 802 where the reader 104 issues a "Recover AC" command or similar signal to the payment device 102. Upon issuing the Recover AC command, in some embodiments, the reader 104 erases the entry from the torn transaction log (to ensure that recovery is not attempted more than once) but it is equally possible to perform step 804 after step 806 if multiple attempts at recovery are desirable. Processing continues at 806 where the reader 104 determines whether a response to the Recover AC command has been received or if a timeout has occurred. If a timeout has occurred, processing continues at 808 and the transaction is terminated. In some embodiments, the reader may transmit a status of the recovery to the terminal 106 (e.g., such as a status of 'undetermined card update') as well as transaction log details. Otherwise, processing continues at 810 where a determination is made whether an AC has been returned from the payment device 102. If not, processing continues at 812 where the reader 104 includes a status of the recovery attempt (e.g., 'no card update') in the transaction outcome details and transmits them to the terminal 106. The reader 104 may then continue normal transaction processing (e.g., by issuing a "Generate AC" command) to complete the transaction as a new transaction with the payment device 102.

If processing at 810 indicates that no AC was received from the payment device 102, processing continues at 814 where the reader 104 attempts to validate the AC received from the payment device 102. For example, the reader 104 may use standard EMV processing techniques to validate the AC. If the AC is valid, processing continues at 820 where the transaction is terminated and a status is set (e.g., 'confirmed card update') and the torn transaction has been successfully recovered. Transaction details are transmitted to the terminal for clearing processing. If processing at 816 results in no validation of the AC, processing continues at 818 where the transaction is terminated and a status is set (e.g., 'undetermined card update') and transaction log details are transmitted to the terminal 106.

In this manner, embodiments allow the recovery of torn or interrupted transactions. The data stored in the reader's torn transaction log may be erased after a few moments to minimize storage requirements or for data security compliance reasons. This "housekeeping" may be performed autonomously by the reader 104 and any erased entries may be sent as signals to the terminal 106 in case the terminal wishes to perform additional business logic processing on these failed transactions (for example if data storage had been performed in the transaction and electronic goods or entitlement supplied). Further, the torn transaction log may store different types of data for different environments.

Figure 9:
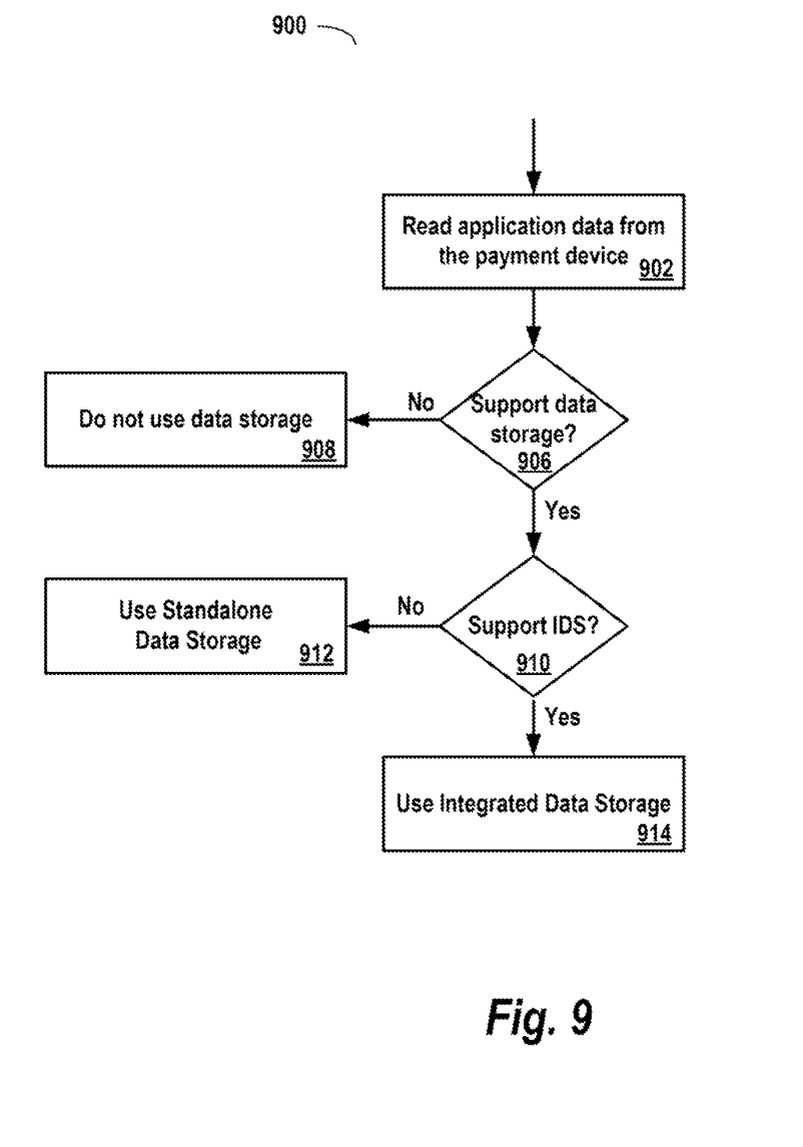

The reader 104 may further be operated to determine an appropriate method of transaction data storage for each transaction in conjunction with terminal 106. In some embodiments, several data storage options may be provided. Reference is now made to FIG. 9 where a process 900 for operating a reader 104 to determine an appropriate storage approach is shown. Pursuant to some embodiments, the payment device 102 can be used as a scratch pad or mini data store with simple write and read functionality. In some embodiments, several types of data storage are possible: standalone data storage ("SDS"), integrated data storage ("IDS"), or no data storage. The process 900 may be performed when the reader 104 receives data from a payment device 102 during a transaction. Processing begins at 902 where the reader receives application data from the payment device. For example, the application data may be received after a process of the reader issues a signal to the payment device 102 selecting an application on the device. The payment device 102 responds with application data and payment device information. Pursuant to some embodiments, the response data includes an indicator specifying whether the payment device supports data storage or not. If the payment device does not support data storage, processing continues at 908 where no data storage on the device is used, and the transaction processing continues as normal. If a flag or indicator in the payment device data indicates that data storage is supported, processing continues at 910 where a determination is made whether IDS storage is supported. If so (and if the reader supports it), processing continues at 914 and IDS data storage is utilized for the transaction processing. If not (and if the reader supports SDS), processing continues at 912 and standalone data storage (SDS) is used.

The terminal 106 would in initiating a transaction with an ACT signal, inform the reader 104 whether it wished to engage in data storage or not. The reader 104 would, if it also recognized data storage availability on the payment device 102, recover the data requested by the terminal 106 and send to the terminal 106 as previously described using signals. It would continue in parallel with the processing of the transaction flow reading other data from the card and would either complete the transaction without updating the data on the card or would receive signals from the terminal 106 with new data to be written which would be interleaved with the transaction flow by reader 104.

Pursuant to some embodiments, SDS uses dedicated commands (e.g., such as "GET DATA" and "PUT DATA") for explicit reading and writing of data. In this case the terminal 106 would indicate in an ACT, UPD or CON signal the specific TLV data that it wished to read or write. In some embodiments, IDS builds the reading and writing functions into existing payment application processing commands. For example, a secure payment solution may be provided without requiring a secret key to be shared between the terminal 106, the reader 104 and the payment device 102. Similarly to the SDS case, the terminal 106 would indicate its desire for data storage in an ACT or UPD signal, would be provided with the data in a REQ signal and would provide new data to be written in a CON signal. Further, because the IDS data storage functionality integrates the non-payment data into existing payment commands, payment and data storage may be performed as part of the same transaction. As data is written to the payment device, each data object is qualified as either permanent or volatile, where the permanent objects are protected against unauthorized overwriting. In some embodiments, the volatile objects can be written freely, but may be discarded later if the payment device runs out of available data slots. In some embodiments, the non-payment data is provided to the payment device in a command such as the "Generate AC" command described above.

By allowing the use of such data storage options, compatibility with a wide variety of readers and payment device schemes may be achieved. Further, as payment devices 102 adopt the IDS data storage options, greater security and efficiency may be provided.

As used herein and in the appended claims, the term "acceptance entity" refers to a retailer or other organization that operates a proximity reader to read information from a payment-enabled mobile device.

As used herein and in the appended claims, a "currency indicator" is a code or data element that indicates what currency, if any, the current transaction is being conducted in. The currency indicator may be a null indicator that does not indicate a specific currency.

The nonvolatile memory referred to herein may be composed of one device or of two or more devices.

As used herein and in the appended claims, a program or device is "configurable between" two or more distinct configurations if input may be provided to the program or device to select between or among the configurations.

Relative to a proximity payment device and a proximity reader, the term "tap" refers either to brief physical contact, or relative positioning such that wireless communication occurs.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable.

As used herein and in the appended claims, the term "payment card account" includes a credit card account, stored value account or a deposit account that the account holder may access using a debit card. The term "payment card account number" includes a number that identifies a payment card account or a number carried by a payment card, or a number that is used to route a transaction in a payment system that handles debit and/or credit transactions. The term "payment card" includes a credit card or a debit card.

As used herein and in the appended claims, the term "payment card system" refers to a system for handling purchase transactions and related transactions and operated under the name of MasterCard, Visa, American Express, Diners Club, Discover Card or a similar system. In some embodiments, the term "payment card system" may be limited to systems in which member financial institutions issue payment card accounts to individuals, businesses and/or other organizations.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A process for operating a reader device, the process comprising:

receiving, by a reader device over a contactless interface, application data comprising a primary account number (PAN) and a PAN sequence number (PSN) from a proximity payment device;

comparing, by the reader device, the PAN and the PSN to data stored in a torn transaction log of said reader device to determine if said proximity payment device was involved in an interrupted transaction at said reader device;

determining, by the reader device, based on the comparison, that said proximity payment device was involved in an interrupted transaction at said reader device;

transmitting, by the reader device, a recover application cryptogram signal to said proximity payment device to attempt to retry said interrupted transaction;

erasing, by the reader device, the data stored in the torn transaction log associated with the interrupted transaction;

receiving, by the reader device, a response signal including an application cryptogram from the proximity payment device;

validating, by the reader device, the received application cryptogram;

transmitting, by the reader device, status data associated with the interrupted transaction and transaction details to a terminal device in communication with the reader device;

analyzing, by the reader device, at least a second portion of the application data and determining a type of data storage supported by the proximity payment device; and conducting, by the reader device, a payment transaction under control of the reader device using the type of data storage supported by the proximity payment device.

2. The process of claim 1, further comprising subsequent to erasing said data stored in said torn transaction log:

determining that a response signal from said proximity payment device was not received and terminating said transaction; and transmitting a signal to a terminal device in communication with said reader device, said signal including status data associated with said interrupted transaction.

3. The process of claim 1, further comprising subsequent to receiving the response signal:

determining that said received application cryptogram is not valid;

transmitting a signal to a terminal device in communication with said reader device, said signal including status data associated with said interrupted transaction; and terminating said transaction.

4. The process of claim 1, further comprising:

receiving a signal from a terminal associated with said reader device, said signal indicating that said reader device is to operate in a data storage mode of operation.

5. A terminal device, comprising: a processor; a communications controller operably connected to the processor; and a data reader operably connected to the processor, the data reader comprising a reader datastore storing a torn transaction log, a reader processor, a reader communications device and a reader storage device, wherein the reader storage device stores instructions that when executed by the reader processor cause the reader processor to perform the steps of:

receiving application data comprising a primary account number (PAN) and a PAN sequence number (PSN) from a proximity payment device;

comparing the PAN and the PSN to data stored in the torn transaction log;

determining, based on the comparison, that the proximity payment device was involved in an interrupted transaction at the reader device;

transmitting a recover application cryptogram signal to the proximity payment device to attempt to retry the interrupted transaction;

erasing the data stored in the torn transaction log associated with the interrupted transaction;

receiving a response signal including an application cryptogram from the proximity payment device;

validating the received application cryptogram;

transmitting status data associated with the interrupted transaction and transaction details to a terminal device in communication with the reader device;

analyzing at least a second portion of the application data and determine a type of data storage supported by the proximity payment device; and conducting a payment transaction under control of the reader device using the type of data storage supported by the proximity payment device.

* * * * *